J. SPEER.
Steam Plow.
No. 29,413.
Patented July 31, 1860.
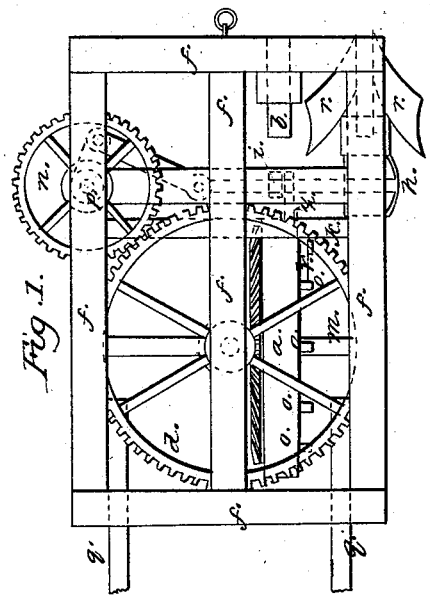
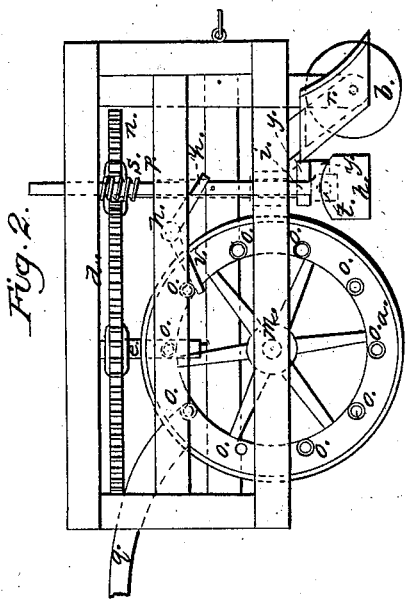
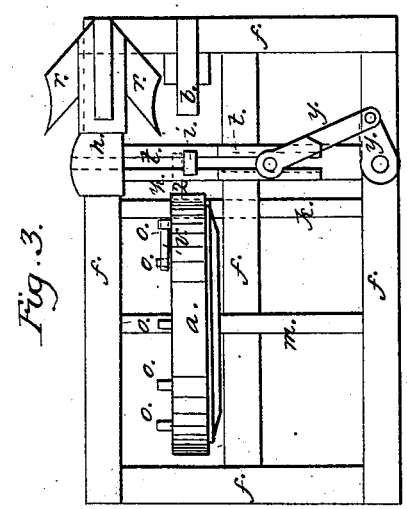
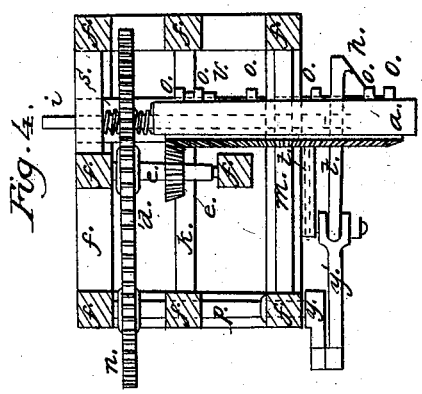
Witnesses:
W. W. Miller
R. H. Marshall
Inventor:
Jesse Speer.

UNITED STATES PATENT OFFICE.

JESSE SPEER, OF HAZLEHURST, MISSISSIPPI.

IMPROVEMENT IN COTTON-CULTIVATORS.

Specification forming part of Letters Patent No. 29,413, dated July 31, 1860.

*To all whom it may concern:*

Be it known that I, JESSE SPEER, of Hazlehurst, Copiah county, and State of Mississippi, have made a new and useful Improvement in Hoeing-Machines; and I hereby declare that the following is a full, clear, and exact description thereof, reference being had to the accompanying drawings, and to the letters of reference marked thereon, making a part of this specification, the same letters being used to designate the same parts shown in the respective views, in which—

Figure 1 is a top view. Fig. 2 is a side elevation, and Figs. 3 and 4 are explanatory views to show more fully the subject. That of Fig. 3 shows the machine looking on its base, and Fig. 4 shows a rear sectional end view having the rear cross-frames removed.

The object of this machine is in the cultivation of cotton and other subjects which is planted in rows in that manner known as "drilling," and when the plant is small. From its uses the rows can be divided and made into hills, leaving the plants to grow in uniformly separated branches or hills.

The machine has a frame made of wood, the various parts marked by letter $f$, in and to which are mounted the other parts constituting the machine as a whole. The row to be operated on when the machine is in use is supposed to be under the side having the cultivator or sweeps $r$ $r$, one being on either side of the plant, for the purpose of shaving down the earth on each side and preparing the ground for the action of the hoe, (marked $h$.) I do not deem it essential, however, the sweeps $r$ $r$ should be used in combination, because a plow can be used for the same object to prepare the rows ready for to be operated on, the team being attached in front by the ring seen in Figs. 1 and 3, and at the rear handles are placed, as indicated by letters $q$, for the purpose of controlling and managing, similar to that of a plow.

The wheel $a$, mounted on shaft $m$, by its rolling as the machine is progressing communicates motion to the hoe. The wheel $b$ is a guide-roller in front, to allow the machine to be turned around and otherwise managed. On one side of wheel $a$ is a cog-wheel, that gears into and drives the pinion $c$, mounted, as well as wheel $d$, on shaft $e$. These wheels being so moved causes the wheel $n$ to revolve and turns the crank $y$, placed on the lower end of its shaft $p$, the crank being joined to the bar $y'$, which has a fork, (see Fig. 4,) which receives the end of the hoe-handle, (marked $t$.)

The bolt which joins $y'$ to $t$ has a head fitting into guide $t'$, to secure the hoe moving both out and inward uniformly, and not take the motion of the crank, except the reciprocating one. As the crank revolves the hoe is both set out to reach across the row and drawn inward to do the cutting, and thus change the row from a drill into hills, this movement emanating from the crank. The hoe when going out must pass above the plant and fall soon as out to the cutting-level. This movement is caused from the actions of the studs $o$ on wheel $a$ being communicated to bar $i$, which is made the guide to the hoe so far as its vertical motion, this bar passing through an upper cross-timber, and also the lower one, on which the guide $t'$ is mounted, its lower end having a square mortise through it, making the guide for the hoe-handle to move in. Below the upper cross-beam is placed the spring $s$, through which $i$ passes for the purpose of forcing the hoe down to its cutting-level, which position is secured by a pin passing through the bar and above the lower beam, there being several holes made in the bar for the pin, so a variation of depth of the cut with the hoe can be made.

Between wheel $a$ and bar $i$ is placed the cross-shaft $k$, on which are two arms, $v$ and $z$. This shaft is made to turn a short distance by the action of the studs $o$ alternately pressing down the arm $v$. As this arm is set down the arm $z$ is set up. The bar $i$ having pins placed through it for the purpose of the arm being retained in position, the arm, pressing against the pin above it, causes the bar to move upward and against the spring. Soon as one of the studs has passed arm $v$ the spring sets down the hoe, and that must be at the time when the crank has set it out and across the row, so the spring can retain the hoe in the position during the time of cutting as the hoe is drawn inward. The studs $o$ on wheel $a$ measures the vertical movement of the hoe, and the manner of gearing to produce the crank motion is important to insure the two actions being at the proper time, so the crank will place the hoe out at the time it is let down ready for cutting. The spaces between the hills necessarily will depend on the arrangement of the wheel $a$ and the other parts acting in combination with it, this, however, depending on the wishes of the planter, who can make his machine accordingly.

After this my description, what I claim as new, and desire to secure by Letters Patent, is—

The combination of the wheel $a$, hoe $h$, and bar $i$, arranged and operated as or substantially as and for the purpose set forth.

JESSE SPEER.

Witnesses:
R. H. MARSHALL,
W. W. MILLER.